United States Patent
Swope et al.

(10) Patent No.: US 9,361,494 B2
(45) Date of Patent: Jun. 7, 2016

(54) SYSTEM AND METHOD OF ESTIMATING TRUE BEARINGS OF RADIO FREQUENCY IDENTIFICATION (RFID) TAGS ASSOCIATED WITH ITEMS LOCATED DIRECTLY UNDERNEATH AN OVERHEAD ANTENNA ARRAY IN A CONTROLLED AREA

(71) Applicant: SYMBOL TECHNOLOGIES, INC., Lincolnshire, IL (US)

(72) Inventors: Charles B Swope, Coral Springs, FL (US); Antonio Faraone, Fort Lauderdale, FL (US); Alexander M Jacques, Kings Park, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 224 days.

(21) Appl. No.: 14/274,141

(22) Filed: May 9, 2014

(65) Prior Publication Data
US 2015/0323662 A1 Nov. 12, 2015

(51) Int. Cl.
*G01S 13/75* (2006.01)
*G06K 7/10* (2006.01)
(Continued)

(52) U.S. Cl.
CPC ............... *G06K 7/10415* (2013.01); *G01S 3/46* (2013.01); *G01S 13/75* (2013.01); *G01S 13/751* (2013.01); *G01S 13/825* (2013.01);
(Continued)

(58) Field of Classification Search
CPC ..... G01S 13/75; G01S 13/751; G01S 13/825; G06K 7/10099; G06K 7/10128; G06K 7/10366; G06K 7/10415

USPC .......................................................... 342/158
See application file for complete search history.

(56) References Cited

U.S. PATENT DOCUMENTS 7,928,894 B1 4/2011 Fox
8,248,306 B2 8/2012 Legay
(Continued)

FOREIGN PATENT DOCUMENTS

CA 2615245 A1 6/2008
WO 9200531 1/1992
(Continued)

OTHER PUBLICATIONS

EPC™ Radio-Frequency Identity Protocols Class-1 Generation-2 UHF RFID Protocol for Communications At 860 MHz-960 MHz; Version 1.2.0; GS1 EPC Global Specification for RFID Air Interface; 108 Pages; Oct. 23, 2008.
(Continued)

*Primary Examiner* — Timothy A Brainard

(57) ABSTRACT

An RFID tag reading system and method estimate true bearings of RFID tags associated with items located in a scan zone directly underneath an overhead array of antenna elements. A controller energizes a plurality of diametrically opposite antenna elements to yield electric fields having polarizations, and switches each antenna element between mutually orthogonal polarizations. A primary transmit beam and a primary receive beam are steered at a primary steering angle over the scan zone, and a plurality of secondary receive beams are steered over the scan zone at different secondary steering angles that are offset from the primary steering angle by receiving secondary receive signals from each tag, and by processing the secondary receive signals to estimate a true bearing for each tag.

20 Claims, 10 Drawing Sheets

(51) Int. Cl.
*G01S 13/82* (2006.01)
*G01S 3/46* (2006.01)
*G01S 3/16* (2006.01)

(52) U.S. Cl.
CPC ....... *G06K 7/10099* (2013.01); *G06K 7/10128* (2013.01); *G06K 7/10366* (2013.01); *G01S 3/16* (2013.01)

(56) References Cited

U.S. PATENT DOCUMENTS

| | | |
|---|---|---|
| 8,493,182 B2 | 7/2013 | Hofer et al. |
| 8,577,308 B2 | 11/2013 | Choi |
| 8,587,495 B2 | 11/2013 | Faraone et al. |
| 2005/0113138 A1 | 5/2005 | Mendolia et al. |
| 2008/0157934 A1 | 7/2008 | Posamentier |
| 2008/0157970 A1 | 7/2008 | Single et al. |
| 2010/0123617 A1 | 5/2010 | Yu et al. |
| 2010/0188211 A1 | 7/2010 | Brommer et al. |
| 2010/0231410 A1 | 9/2010 | Seisenberger et al. |
| 2011/0050421 A1 | 3/2011 | Duron et al. |
| 2012/0075073 A1* | 3/2012 | Fislage .............. G06K 7/10435 340/10.1 |
| 2012/0139810 A1 | 6/2012 | Faraone et al. |
| 2012/0189078 A1 | 7/2012 | Eom |
| 2012/0248187 A1* | 10/2012 | Piazza ..................... H01Q 3/00 235/439 |
| 2012/0262358 A1 | 10/2012 | Wallner |
| 2013/0106671 A1 | 5/2013 | Eom |
| 2013/0113669 A1* | 5/2013 | Bellows .............. H01Q 1/2216 343/764 |
| 2013/0201003 A1 | 8/2013 | Sabesan et al. |

FOREIGN PATENT DOCUMENTS

| | | |
|---|---|---|
| WO | 2008082434 A2 | 7/2008 |
| WO | 2009151778 A2 | 12/2009 |
| WO | 2011135328 A2 | 11/2011 |

OTHER PUBLICATIONS

International Search Report and Written Opinion mailed Aug. 5, 2015 in counterpart PCT application PCT/US2015/029423.

* cited by examiner

SYSTEM AND METHOD OF ESTIMATING TRUE BEARINGS OF RADIO FREQUENCY IDENTIFICATION (RFID) TAGS ASSOCIATED WITH ITEMS LOCATED DIRECTLY UNDERNEATH AN OVERHEAD ANTENNA ARRAY IN A CONTROLLED AREA

CROSS REFERENCE TO RELATED APPLICATION

The present disclosure is related to U.S. patent application Ser. No. 14/106,368, filed Dec. 13, 2013, the entire contents of which are hereby incorporated herein by reference thereto.

BACKGROUND OF THE INVENTION

The present disclosure relates generally to a system for, and a method of, estimating true bearings of radio frequency (RF) identification (RFID) tags associated with items located below an overhead array of antenna elements in a controlled area, especially RFID-tagged items located in a zone directly underneath the array.

Radio frequency (RF) identification (RFID) technology is becoming increasingly important for logistics concerns, material handling and inventory management in retail stores, warehouses, distribution centers, buildings, and like controlled areas. An RFID system typically includes an RFID reader, also known as an RFID interrogator, and preferably a plurality of such readers distributed about the controlled area. Each RFID reader interrogates at least one RFID tag, and preferably many more RFID tags, in its coverage range. Each RFID tag is usually attached to, or associated with, an individual item, or to a package for the item, or to a pallet or container for multiple items. Each RFID tag typically includes an antenna, a power management section, a radio section, and frequently a logic section containing a control microprocessor, a memory, or both. Each RFID reader transmits an RF interrogating signal, and each RFID tag, which senses the interrogating RF signal, responds by transmitting a return RF response signal. The RFID tag either generates the return RF response signal originally, or reflects back a portion of the interrogating RF signal in a process known as backscatter. The return RF response signal may further encode data stored internally in the tag. The return signal is demodulated and decoded into data by each reader, which thereby identifies, counts, or otherwise interacts with the associated item. The decoded data, also known as a payload, can denote a serial number, a price, a date, a destination, other attribute(s), or any combination of attributes, and so on.

The RFID system is often used in an inventory monitoring application. For example, in order to take inventory of RFID-tagged items in a retail store, it is known to position at least one RFID reader overhead in a controlled area, and then, to allow each reader to automatically read whatever tagged items are in the coverage range of each reader. For superior RF coverage, it is known to provide each reader with at least one overhead array of antenna elements that are arranged about a central vertical axis, also known as a plumb line, and that transmit the RF interrogating signal as a primary transmit beam that is electronically steered both in azimuth and in elevation, and that receive the return RF response signal via a primary receive beam from the tags.

As satisfactory as such known RFID systems utilizing antenna arrays have been in monitoring inventory, they can also be used for locationing applications, i.e., for accurately estimating and determining the true bearing, i.e., the angular direction both in azimuth and elevation, of any particular tag, relative to a particular reader. However, there is a practical limit on the number of antenna elements that can be used in each array. This antenna element limit causes each primary transmit beam and each corresponding primary receive beam to have a relatively broad beam width. The primary transmit beam is typically steered until the reader reads the tag with the highest or peak receive signal strength (RSS) of the primary receive beam at a primary steering angle. However, estimating the bearing, i.e., the angular direction both in azimuth and elevation, of any particular tag based on the peak RSS of the primary receive beam is imprecise due to the aforementioned relatively broad beam width. Bearing errors on the order of 5 to 10 degrees have been reported and are not readily tolerable in locationing applications.

To improve the accuracy of estimating the location of a particular tag, it has been proposed in the above-identified patent application to generate multiple secondary receive beams pointing in different directions to independently measure the peak RSS for a particular tag. These secondary receive beams are processed to generate azimuth and elevation error signals as azimuth and elevation corrections to the primary steering angle of the primary receive beam, thereby reducing the bearing error.

Yet, as advantageous as the RFID system disclosed in the above-identified patent application has been in accurately locating the true bearings of tags generally located in the controlled area, there is a so-called "dead" zone in the controlled area in which the true bearings of any tags therein are not so accurately estimated, if at all. This dead zone is the scan area directly underneath the antenna array. More particularly, this dead zone extends over a conical, three-dimensional, spatial sector subtending a solid angle whose vertex is centered on the aforementioned vertical axis or plumb line. Still more particularly, this dead zone extends downwardly away from the vertex and measures about 30 degrees in elevation on each side of, and upwardly away from, the vertical axis, and 360 degrees in azimuth around the vertical axis.

This dead zone is a result of the known practice of energizing circumferentially adjacent antenna elements with the same polarization or orientation of its electric field. For example, it is known to energize two pairs of circumferentially adjacent antenna elements, all with the same vertical (or horizontal) polarization, to obtain four commonly-polarized secondary receive beams. This, however, causes the beams of the energized antenna elements to exhibit low directivity towards the dead zone, and also causes little electromagnetic power density to be present in the dead zone. The amount of such electromagnetic power density in the dead zone may be sufficient for monitoring applications, but is less sufficient, and often insufficient, for locationing applications. The above-described primary and secondary beams are thus not steerable through the dead zone. As a result, the known RFID system may detect a tag in the dead zone, but cannot readily determine or estimate its true bearing.

Accordingly, there is a need to estimate the true bearings of RFID tags located anywhere in a controlled area, and particularly in the zone directly underneath an overhead array of antenna elements of an RFID reader.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 1 is a schematic view of an exemplary radio frequency identification (RFID) tag reading system for estimating true bearings of RFID tags associated with items in a controlled area in accordance with the present disclosure.

Figure 1:
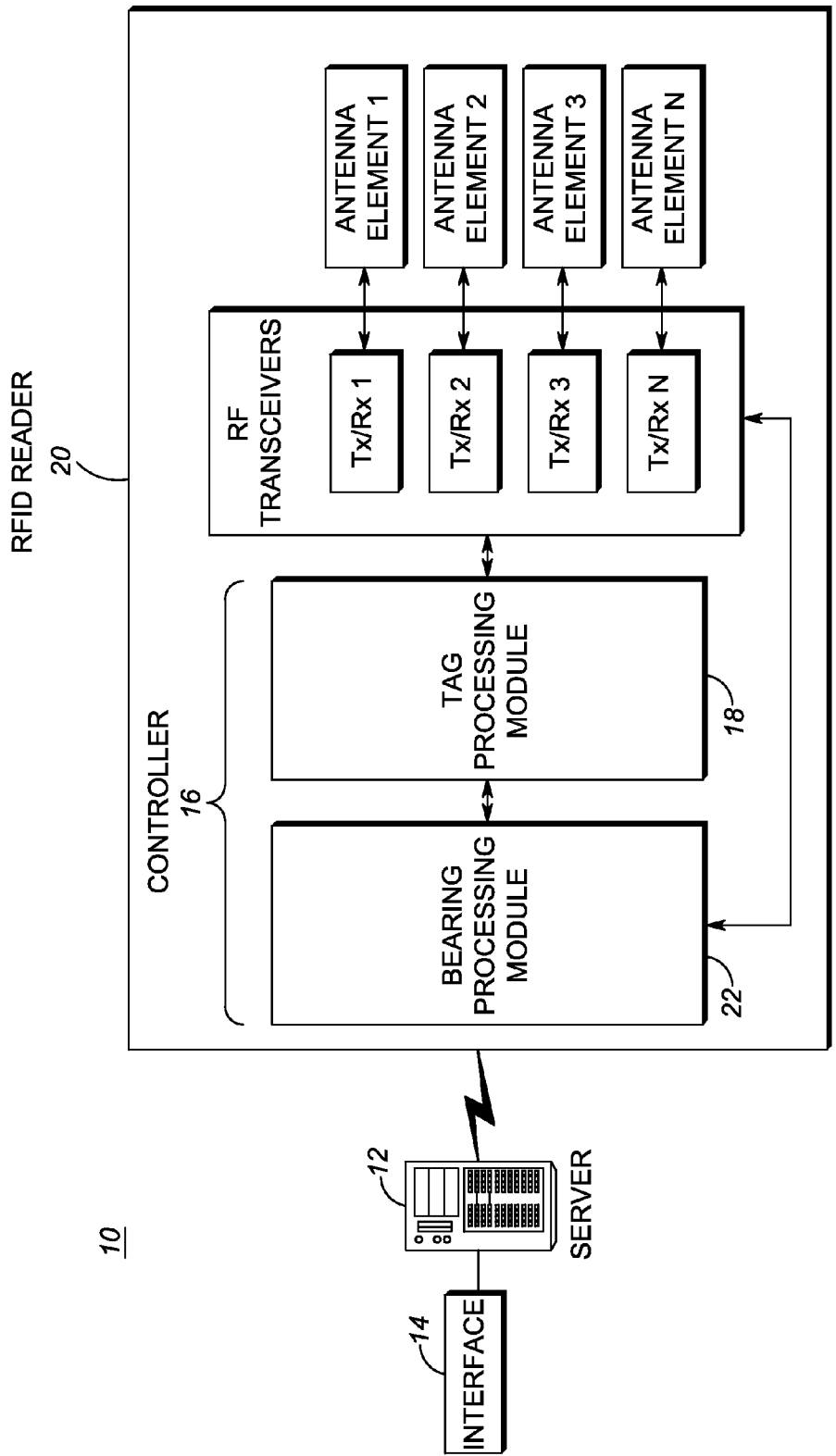

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The present disclosure relates to a radio frequency (RF) identification (RFID) tag reading system for estimating true bearings of RFID tags associated with items in a controlled area. The controlled area may be a retail store, a warehouse, or any other confined or open area in which RFID-tagged items are to be monitored. The system includes an RFID reader having an overhead array of antenna elements, e.g., a beamforming array, arranged about a vertical axis or plumb line; a plurality of RF transceivers; and a controller or programmed microprocessor operatively connected to the transceivers, and operative for controlling the transceivers.

The controller initially executes an antenna processing module operative for energizing a plurality of the antenna elements at opposite sides of the vertical axis, i.e., not circumferentially adjacent, to yield electric fields having polarizations, and for switching each antenna element between mutually orthogonal polarizations (e.g., vertical and horizontal). The polarizations are electric field vector polarizations, where the horizontal polarization vector is orthogonal to the vertical axis. In one preferred embodiment, a first pair of the antenna elements at opposite sides of the vertical axis is energized to yield an electric field having one of the mutually orthogonal polarizations (vertical or horizontal), and a different second pair of the antenna elements at different opposite sides of the vertical axis is energized to yield an electric field having the other of the mutually orthogonal polarizations (horizontal or vertical). Preferably, the first pair of the antenna elements are diametrically opposite to each other along a first horizontal path across the axis; the second pair of the antenna elements are diametrically opposite to each other along a second horizontal path across the axis; and the first and second paths intersect each other and are mutually orthogonal. In another preferred embodiment, one pair of the antenna elements at opposite sides of the vertical axis is energized to yield an electric field having one of the mutually orthogonal polarizations (horizontal or vertical), and another pair of the antenna elements at the same opposite sides of the vertical axis is energized to yield an electric field having the same one of the mutually orthogonal polarizations (horizontal or vertical) as that of the first pair of the antenna elements. Preferably, the one pair of the antenna elements are diametrically opposite to each other along a first horizontal path across the axis at one elevation; and the other pair of the antenna elements are diametrically opposite to each other along a second horizontal path across the axis at another elevation; and the first and second horizontal paths are generally parallel to each other.

The controller also executes a tag processing module operative for steering a primary transmit beam throughout the controlled area, including a scan zone directly underneath the overhead array, by transmitting a primary transmit signal, via the plurality of the antenna elements to each tag, and for steering a primary receive beam throughout the controlled area, including the scan zone, at a primary steering angle by receiving a primary receive signal via the plurality of the antenna elements from each tag. The controller further executes a bearing processing module operative for steering a plurality of secondary receive beams, preferably simultaneously, throughout the controlled area, including the scan zone, at different secondary steering angles that are offset from the primary steering angle by receiving a plurality of secondary receive signals via the plurality of the antenna elements from each tag, and by processing the secondary receive signals to determine a true bearing for each tag throughout the controlled area, including the scan zone.

Preferably, the bearing processing module is operative for steering a first pair of the secondary receive beams at opposite sides of the primary transmit beam or the primary receive beam in elevation, and for processing a first pair of the secondary receive signals to obtain a pair of elevation offset signals. The bearing processing module is further operative for steering a second pair of the secondary receive beams at opposite sides of the primary transmit beam or the primary receive beam in azimuth, and for processing a second pair of the secondary receive signals to obtain a pair of azimuth offset signals. The bearing processing module is still further operative for processing the elevation offset signals by dividing their difference by their sum to obtain an elevation error signal as an elevation correction to the primary steering angle, and for processing the azimuth offset signals by dividing their difference by their sum to obtain an azimuth error signal as an azimuth correction to the primary steering angle.

Thus, the primary steering angle is corrected by these error signals, thereby resulting in a true bearing estimate for each tag, and especially for those tags located in the scan zone. The scan zone extends over a three-dimensional, spatial sector that subtends a solid angle whose vertex is centered on the vertical axis or plumb line, that extends downwardly away from the vertex, and that measures about 30 degrees in elevation on each side of, and upwardly away from, the vertical axis, and 360 degrees in azimuth around the vertical axis.

A method, in accordance with another aspect of this disclosure, relates to a radio frequency (RF) identification (RFID) tag reading method of estimating true bearings of RFID tags associated with items in a controlled area. The method is performed by mounting an RFID reader at an overhead location in the controlled area above a scan zone; arranging an overhead array of antenna elements for the reader about a vertical axis or plumb line; operatively connecting a plurality of RF transceivers to a controller; controlling the transceivers by having a controller execute an antenna processing module operative for energizing a plurality of the antenna elements at opposite sides of the vertical axis to yield electric fields having polarizations, and for switching each antenna element between mutually orthogonal polarizations; controlling the transceivers by having the controller execute a tag processing module operative for steering a primary transmit beam throughout the controlled area, including the scan zone directly underneath the overhead array, by transmitting a primary transmit signal via the plurality of the antenna elements to each tag, and for steering a primary receive beam throughout the controlled area, including the scan zone, at a primary steering angle by receiving a primary receive signal via the plurality of the antenna elements from each tag; and controlling the transceivers by having the controller execute a bearing processing module operative for steering a plurality of secondary receive beams throughout the controlled area, including the scan zone, at different secondary steering angles that are offset from the primary steering angle by receiving a plurality of secondary receive signals via the first and second pairs of the antenna elements from each tag, and by processing the secondary receive signals to determine a true bearing for each tag throughout the controlled area, including the scan zone.

Turning now to the drawings, FIG. 1 depicts a simplified radio frequency (RF) identification (RFID) tag reading system 10 for estimating true bearings of RFID tags associated with items to be tracked or monitored. The system 10 has an RFID reader 20 connected to a server or host 12 and a user interface 14. The RFID reader 20 has an array of antenna elements 1, 2, 3 . . . , N, preferably a beamforming array. The RFID reader 20 also has a plurality of RF transceivers Tx/Rx 1, Tx/Rx 2, Tx/Rx 3, . . . , Tx/Rx N, one transceiver for, and connected to, each antenna element. The number N is arbitrary and depends on the particular application. By way of non-limiting example, sixteen antenna elements and sixteen transceivers may be employed. As explained below, the antenna elements work in groups, typically four at a time. Although FIG. 1 depicts one transceiver for each antenna element, this need not be the case. The number of transceivers may be different from the number of antenna elements. For example, a particular transceiver may be shared with two or more antenna elements.

A controller or programmed microprocessor 16 is operatively connected to the transceivers to control their operation in one or more scans or modes of operation, as described below. The controller 16 executes a software-based, tag processing module 18 during an initial coarse scan and a subsequent fine scan, and also executes a software-based, bearing processing module 22 during the fine scan. The modules 18 and 22 need not be software-based, but either or both of them could be hardware-based, or could be implemented in both software and hardware. The coarse and fine scans need not be separate distinct scans, but can be successively performed in a single scan. Although the bearing processing module 22 is depicted in FIG. 1 as being implemented in the RFID reader 20, it will be understood that the bearing processing module 22, either in whole or in part, can also be implemented in the server 12.

Figure 2:
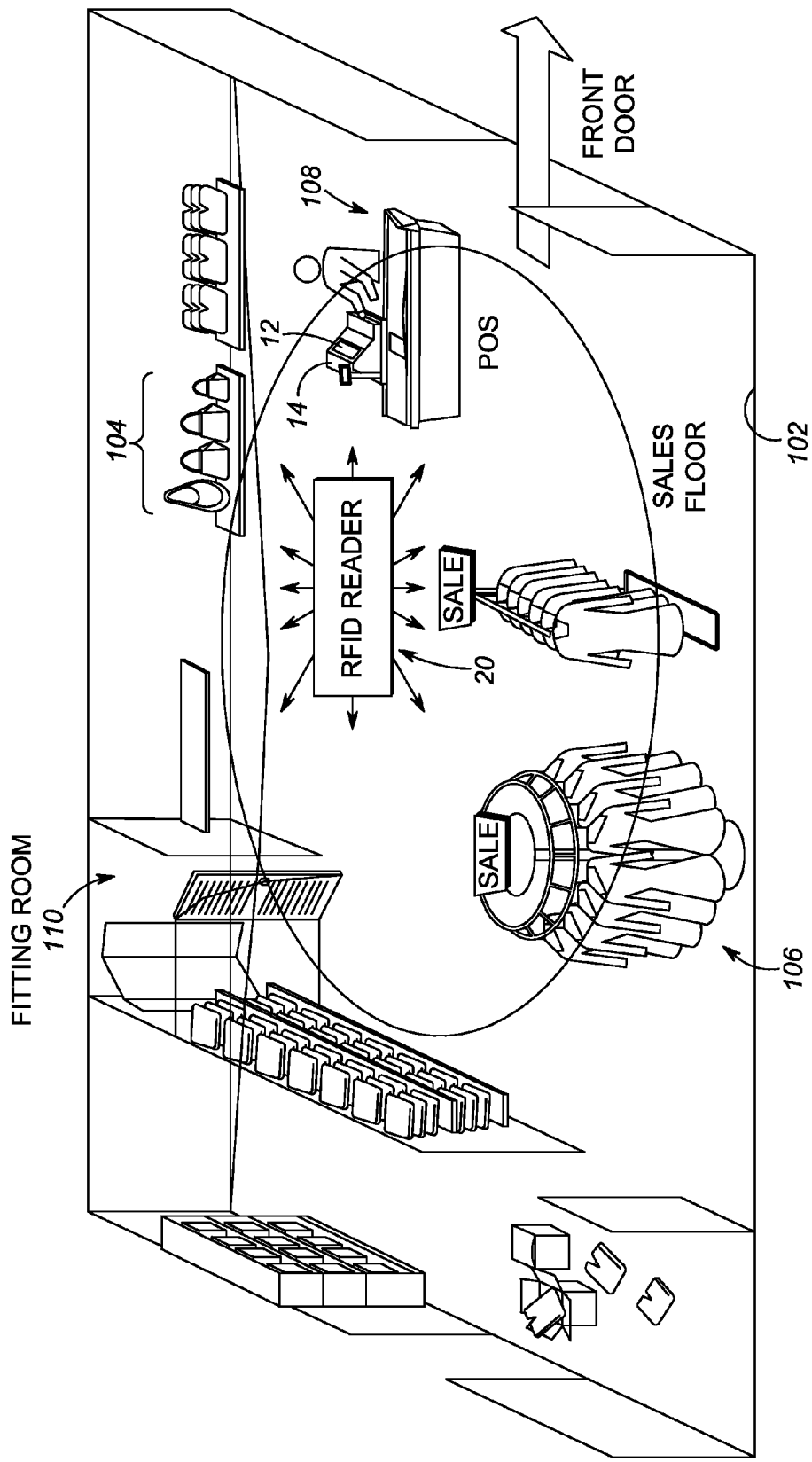
FIG. 2 is a perspective, schematic view of the system of FIG. 1 with an RFID reader and its array of antenna elements installed overhead in an exemplary controlled area, especially for locationing RFID-tagged items located in a zone directly underneath the overhead RFID reader and antenna array.

FIG. 2 depicts an exemplary RFID reader 20 deployed in a controlled area 102 of a retail sales floor having a point-of-sale (POS) station 108 at which the server 12 and the interface 14 may be provided, a fitting room 110, and a plurality of RFID-tagged items, e.g., clothes 106, handbags 104, etc., arranged on shelves, hangers, racks, on the floor, etc. in the controlled area 102. It will be understood that, in some applications, the server 12 is preferably located in a backroom, well away from the sales floor. Each RFID-tagged item 104, 106 is preferably associated with a passive RFID tag, e.g., not battery-operated, for cost reduction reasons, although other types of RFID tags may be employed. It will be further understood that, in some applications, for example, in a warehouse, each RFID tag is associated with a pallet or container for multiple items. To simplify the drawing, only one reader 20 has been illustrated, and the reader 20 has been illustrated as being preferably located overhead on the ceiling in the controlled area 102. It will be still further understood that more than one reader 20 could be deployed in the controlled area 102, and not necessarily deployed on the ceiling. Each reader 20 may be powered from an electrical outlet, powered over the Ethernet (POE), or can be battery powered.

The server 12 comprises one or more computers and is in wired, wireless, direct, or networked communication with the interface 14 and with the reader 20. The interface 14 provides a human/machine interface, e.g., a graphical user interface (GUI), that presents information in pictorial and/or textual form (e.g., representations of bearings of the RFID-tagged items 104, 106) to a human user, and to initiate and/or alter the execution of various processes that may be performed by the server 12 and/or by the controller 16. The server 12 and the interface 14 may be separate hardware devices and include, for example, a computer, a monitor, a keyboard, a mouse, a printer, and various other hardware peripherals, or may be integrated into a single hardware device, such as a mobile smartphone, or a portable tablet, or a laptop computer. Furthermore, the user interface 14 can be in a smartphone, or tablet, etc., while the server 12 may be a computer, either located at a controlled area 102 (see FIG. 2) containing the RFID-tagged items 104, 106, or remotely at some other location, or can be hosted in a cloud server. The server 12 advantageously includes a wireless RF transceiver that communicates with the reader 20. For example, Wi-Fi and Bluetooth® are open wireless standards for exchanging data between electronic devices.

Figure 3A:
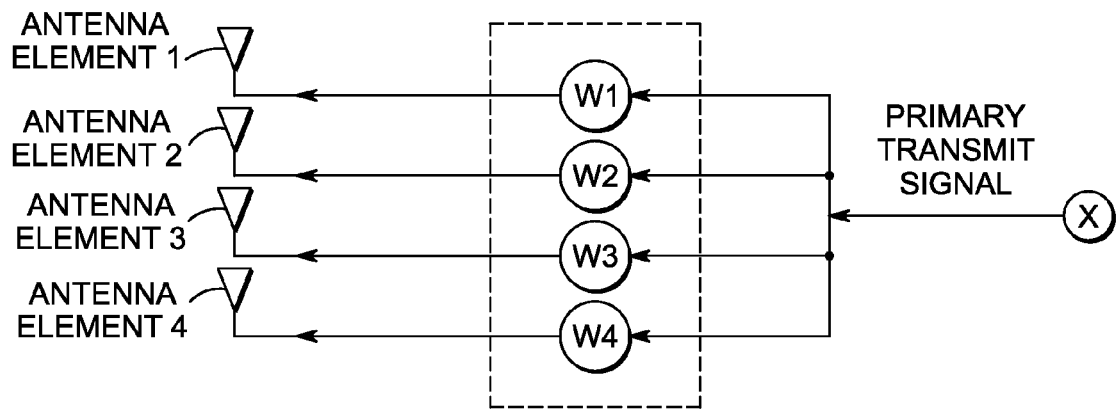
FIG. 3A is a schematic diagram depicting components of the overall system of FIG. 1 during transmission of the primary transmit beam.
Figure 3B:
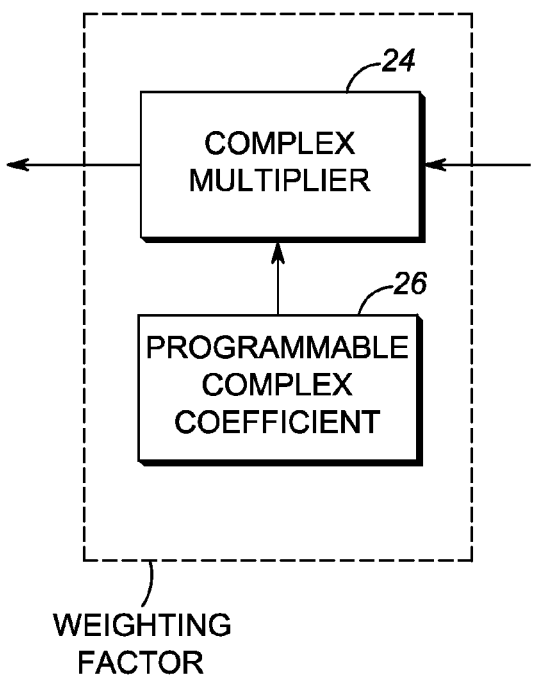
FIG. 3B is a block diagram depicting a detail of a weighting factor component for use in beam steering in the system.

During execution of the aforementioned initial or coarse scan, the controller 16 executes the tag processing module 18 by which the transceivers are commanded to act as a primary transmit beam steering unit operative for steering a primary transmit beam over a specific region of the controlled area 102 by transmitting a primary transmit signal (X) via the antenna elements to each tag. As shown in FIG. 3A, the primary transmit signal (X) is conducted along different channels (in this example, four) to a plurality of the antenna elements 1, 2, 3 and 4. Steering is accomplished by introducing a complex weighting factor W1, W2, W3 and W4 on each channel, thereby altering the respective magnitudes and phases of the signal on each channel. As shown in FIG. 3B, each weighting factor can be generated by a complex multiplier 24 and a programmable device 26 that sets a complex coefficient for the complex multiplier 24 to effect baseband steering of the primary transmit beam. Baseband steering of the primary transmit beam by setting a complex coefficient for each complex multiplier 24 is known in the art, and details thereof can be obtained, for example, by reference to U.S. Pat. No. 8,587, 495 and/or to "A Primer on Digital Beamforming", by Toby Haynes, in Spectrum Signal Processing, Mar. 26, 1998, the entire contents of said patent and said primer being incorporated herein by reference thereto.

Figure 4:
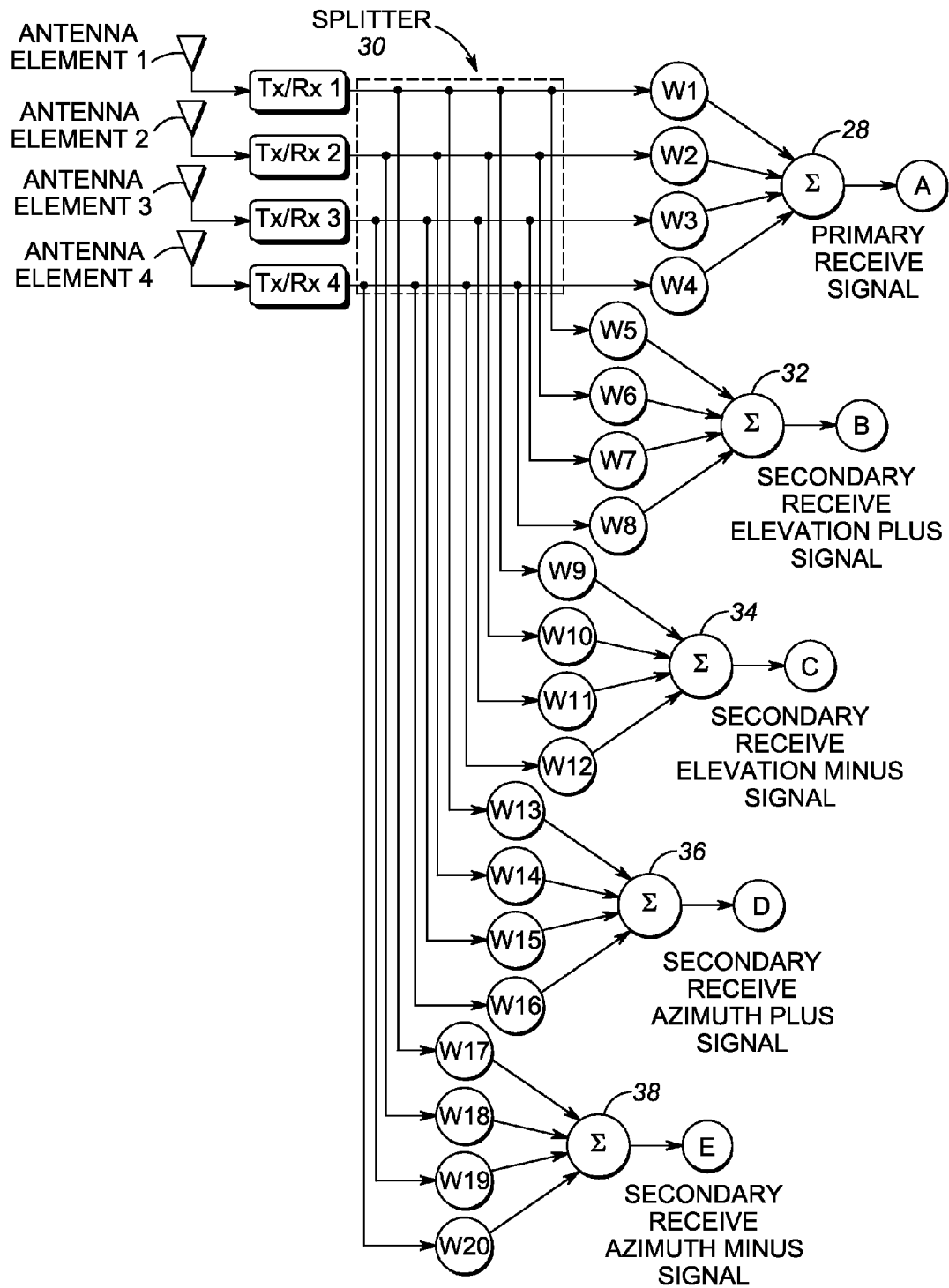
FIG. 4 is a schematic diagram depicting components of the overall system of FIG. 1 during reception of the primary receive beam, as well as of additional secondary receive beams.

During the coarse scan, the controller 16 also executes the tag processing module 18 by which the transceivers are commanded to act as a primary receive beam steering unit operative for steering a primary receive beam at a primary steering angle by receiving a primary receive signal (A) via the antenna elements from each tag. As shown in FIG. 4, the antenna elements 1, 2, 3 and 4 receive return signals from each interrogated tag along different channels (in this example, four), and then a complex weighting factor W1, W2, W3 and W4 is introduced on each channel before all the weighted return signals are summed in an adder 28 in order to generate the primary receive signal (A). Each weighting factor is generated by the circuit of FIG. 3B. Steering of the primary receive beam is effected by the weighting factors W1, W2, W3 and W4. As illustrated, the weighting factors (FIG. 4) used in steering the primary receive beam is, in a preferred embodiment, the same as the weighting factors (FIG. 3A) used in steering the primary transmit beam. As a result, the steering angle for both the primary transmit beam and the primary receive beam is the same, or nearly so, i.e., they have a common boresight or general bearing, in which event, both the primary transmit beam and the primary receive beam can each be individually referred to as a reference beam. However, it will be understood that the weighting factors used in steering the primary receive beam may be different from the weighting factors used in steering the primary transmit beam, in which case, the steering angle for the primary transmit beam is different from the steering angle for the primary receive beam.

As described above, the practical limit on the number N of antenna elements that can be used in the array causes the primary transmit beam and the corresponding primary receive beam to each have a relatively broad beam width, thereby rendering it difficult in practice to very accurately determine or estimate the true bearing, i.e., the angular direction both in azimuth and elevation, of a particular tag, relative to the reader. Bearing errors on the order of 5 to 10 degrees have been reported and are not tolerable in many applications. One aspect of this disclosure is directed to reducing such errors, preferably to less than one degree.

As further shown in FIG. 4, the return signals from each interrogated tag from the antenna elements 1, 2, 3 and 4 are conducted through respective RF transceivers Tx/Rx 1, Tx/Rx 2, Tx/Rx 3 and Tx/Rx 4, to a splitter 30, and then routed to four sub-circuits to simultaneously generate four different secondary receive signals corresponding to four different secondary receive beams that are offset from the reference beam, as described below. Thus, the return signals are conducted from the splitter 30 to weighting factors W5, W6, W7 and W8 before being summed in an adder 32 to generate a secondary receive plus elevation signal (B), corresponding to a synthesized receive beam featuring a larger peak elevation angle than the reference beam; to weighting factors W9, W10, W11 and W12 before being summed in an adder 34 to generate a secondary receive minus elevation signal (C), corresponding to a synthesized receive beam featuring a smaller peak elevation angle than the reference beam; to weighting factors W13, W14, W15 and W16 before being summed in an adder 36 to generate a secondary receive plus azimuth signal (D), corresponding to a synthesized receive beam featuring a larger peak azimuth angle than the reference beam; and to weighting factors W17, W18, W19 and W20 before being summed in an adder 38 to generate a secondary receive minus azimuth signal (E), corresponding to a synthesized receive beam featuring a smaller peak azimuth angle than the reference beam. Put another way, the return signal from antenna element 1 is conducted through transceiver Tx/Rx 1 to weighting factors W1, W5, W9, W13 and W17; the return signal from antenna element 2 is conducted through transceiver Tx/Rx 2 to weighting factors W2, W6, W10, W14 and W18; the return signal from antenna element 3 is conducted through transceiver Tx/Rx 3 to weighting factors W3, W7, W11, W15 and W19; and the return signal from antenna element 4 is conducted through transceiver Tx/Rx 4 to weighting factors W4, W8, W12, W16 and W20.

Each weighting factor W5 through W20 is generated by a circuit identical to that depicted in FIG. 3B. The weighting factors W5, W6, W7 and W8 are selected such that the secondary receive beam formed by the plus elevation signal (B) has a steering angle that is located a few degrees, e.g., ten degrees, in one direction away from the elevation of the primary steering angle of the reference beam, and the weighting factors W9, W10, W11 and W12 are selected such that the secondary receive beam formed by the minus elevation signal (C) has a steering angle that is located a few degrees, e.g., ten degrees, in an opposite direction away from the elevation of the primary steering angle of the reference beam. The weighting factors W13, W14, W15 and W16 are selected such that the secondary receive beam formed by the plus azimuth signal (D) has a steering angle that is located a few degrees, e.g., ten degrees, in one direction away from the azimuth of the primary steering angle of the reference beam. The weighting factors W17, W18, W19 and W20 are selected such that the secondary receive beam formed by the minus azimuth signal (E) has a steering angle that is located a few degrees, e.g., ten degrees, in an opposite direction away from the azimuth of the primary steering angle of the reference beam.

Thus, four secondary receive beams have been formed. The secondary receive beams may be formed simultaneously, or sequentially provided that they are all formed within a time frame during which the RFID tag being located is not expected to be moved to any appreciable extent. The secondary receive beams formed by the plus and minus elevation signals (B) and (C) bracket the elevation of the reference beam. The secondary receive beams formed by the plus and minus azimuth signals (D) and (E) bracket the azimuth of the reference beam. The terms "plus" and "minus", as used herein to describe the signals (B), (C), (D), and (E), are intended to describe the opposite directions in which the secondary receive beams are steered.

Figure 5:
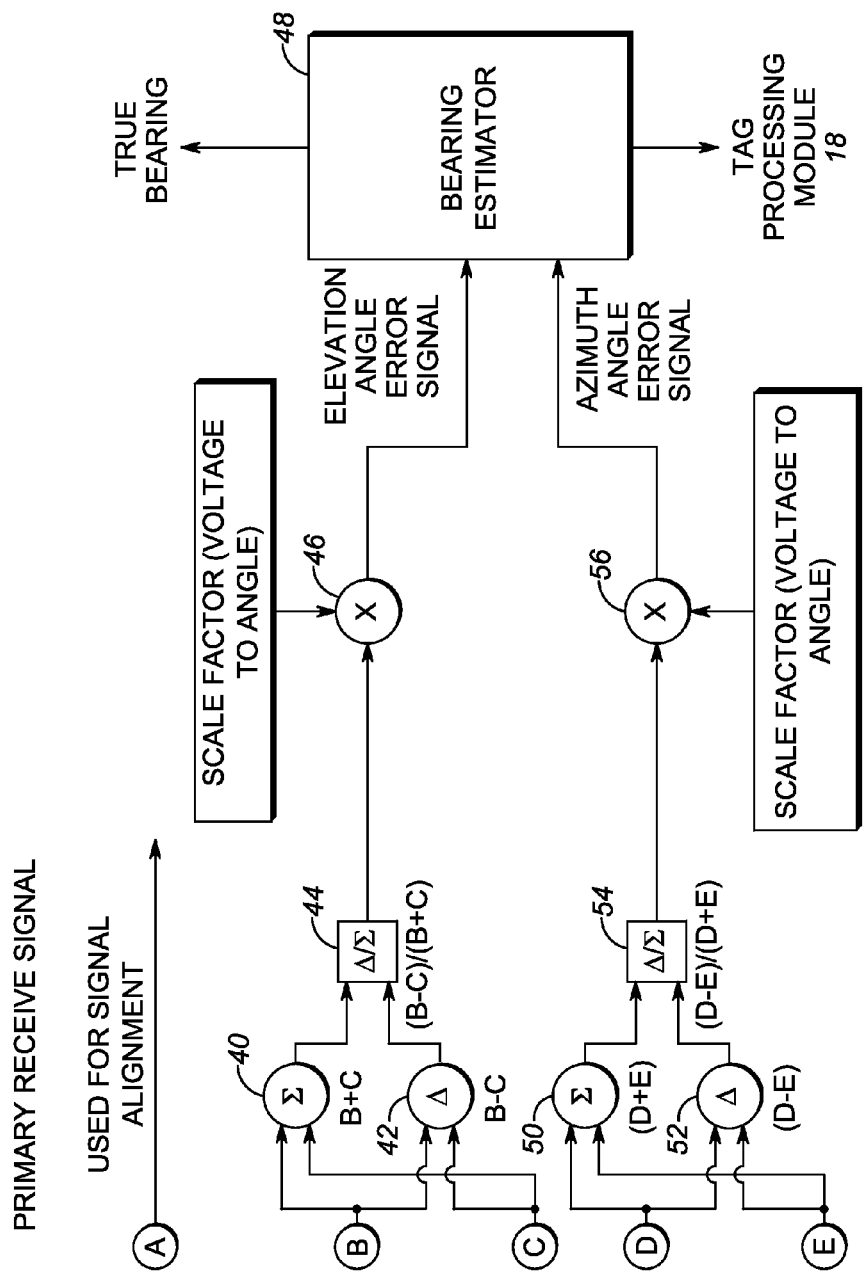
FIG. 5 is a block diagram depicting signal processing of the primary and the secondary receive beams depicted in FIG. 4 to obtain a true bearing for each RFID-tagged item.

Turning now to FIG. 5, the elevation signals (B) and (C) and the azimuth signals (D) and (E) are separately processed to obtain elevation and azimuth bearing correction factors used to determine the true bearing of each interrogated tag. Thus, the elevation signals (B) and (C) are summed in an adder 40, and are differenced from each other in a subtractor 42. A divider 44 divides the difference (B−C) from the subtractor 42 by the sum (B+C) from the adder 40, and the output of the divider 44, which is a voltage, is converted to an angle by a converter 46, thereby yielding an elevation angle error signal that is input to a bearing estimator 48. Also, the azimuth signals (D) and (E) are summed in an adder 50, and are differenced from each other in a subtractor 52. A divider 54 divides the difference (D−E) from the subtractor 52 by the sum (D+E) from the adder 50, and the output of the divider 54, which is a voltage, is converted to an angle by a converter 56, thereby yielding an azimuth angle error signal that is input to the bearing estimator 48. The bearing estimator 48 compares the two elevation and azimuth angle error signals against the elevation and azimuth of the primary receive signal (A), and outputs a true bearing for each interrogated tag. This output can be stored, or sent to the server 12, or it can be sent to the tag processing module 18 for beam steering.

As described above, four of the antenna elements are employed to steer the four secondary receive beams around the reference beam. In another embodiment, sixteen RF transceivers may be used to connect to sixteen antenna elements, and the beams corresponding to signals (A), (B), (C), (D), and (E) may be formed using a circuit that employs sixteen complex multipliers. In yet another embodiment, sixteen antenna elements are employed in the array, and a switch is used to switch the same four RF transceivers to four of the sixteen antenna elements. At any given time, four out of the sixteen antenna elements are active, while the remaining twelve antenna elements are inactive. These four antenna elements are effectively working in one volume or sector of space in the controlled area 102. The remaining antenna elements in the array are preferably working successively or sequentially in the same or in different volumes or sectors of space in the controlled area. The antenna elements work in groups, typically four at a time, and advantageously, there may be overlap in volume or sector coverage between antenna elements in the different groups. It will be understood that this disclosure is not intended to be limited to a group of four antenna elements, because a different number or group of antenna elements, and a different number or group of secondary receive beams, could be employed.

As described above, four separate subcircuits are employed, as shown in FIG. 4, to simultaneously generate the two elevation signals (B) and (C) and the two azimuth signals (D) and (E), and to simultaneously steer their secondary receive beams. In a time-multiplexed variation, one or more such subcircuits can be shared. For example, only one such subcircuit could be employed, and different sets of weighting factors could be sequentially applied at the one such subcircuit to sequentially generate the signals (B), (C), (D) and (E), and to sequentially steer their secondary receive beams.

Figure 6:
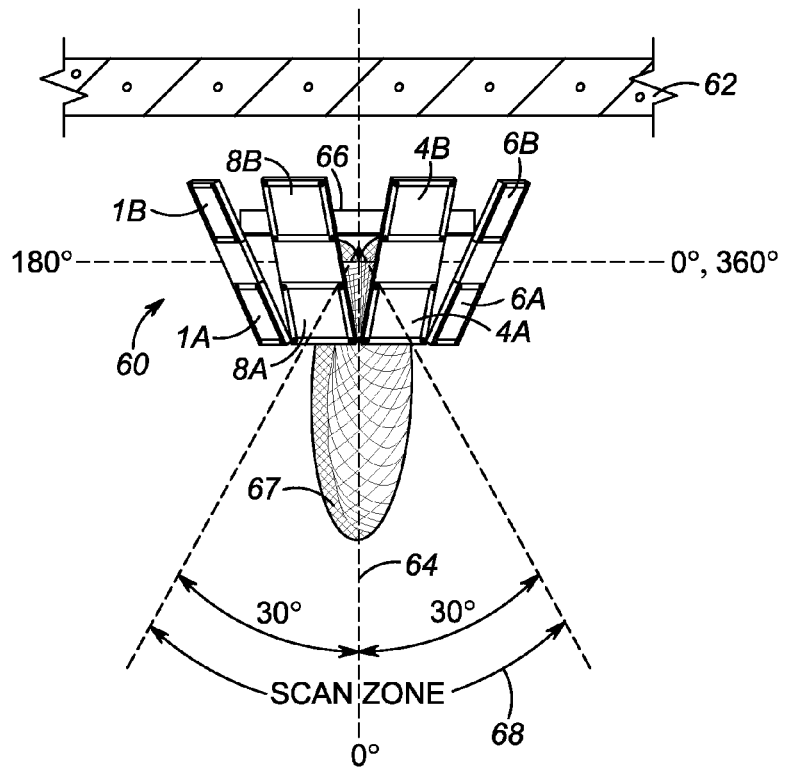
FIG. 6 is a side view of the overhead RFID reader and array of FIG. 2 and depicting the zone directly underneath them.
Figure 7:
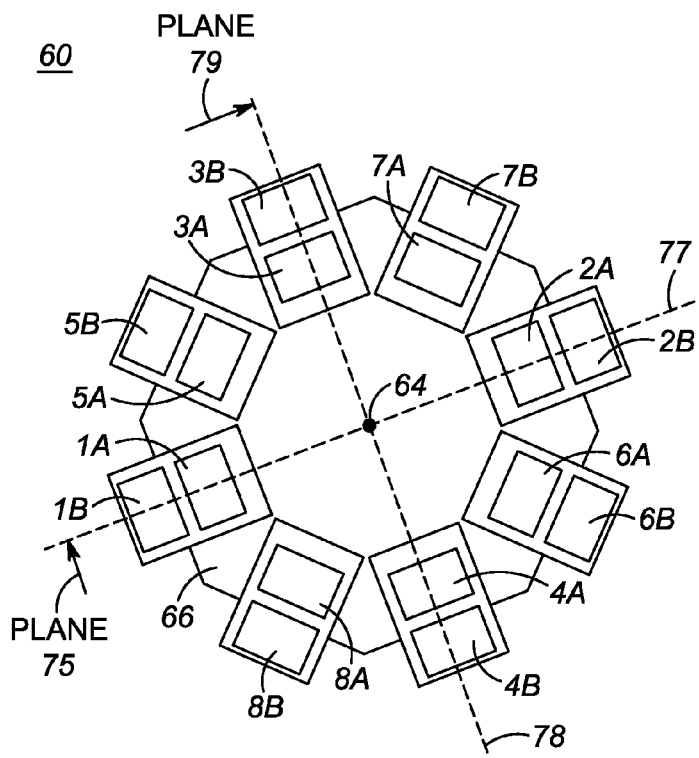
FIG. 7 is a top plan view looking down on the array of FIG. 6.

FIGS. 6-7 depict one embodiment of an overhead antenna array 60 for the reader 20. The reader 20 may have a plurality of such arrays 60. The overhead array 60 is mounted on a planar ceiling 62 and is advantageously comprised of sixteen antenna elements arranged, preferably equiangularly, circumferentially around and about a central vertical axis 64, or plumb line, which is generally perpendicular to the plane of the ceiling 62. The antenna elements are mounted in pairs on generally planar supports or antenna planes that are tilted relative to the vertical axis 64 and assume a generally frusto-conical shape. Antenna elements 1A, 2A, 3A, 4A, 5A, 6A, 7A and 8A are arranged in a lower annulus at a lower elevation as compared to an upper annulus in which the antenna elements 1B, 2B, 3B, 4B, 5B, 6B, 7B and 8B are arranged at a higher elevation. As previously noted, the antenna elements work in groups, typically four at a time. Each antenna element is advantageously configured as a patch antenna. As described below, each antenna element is energizable and individually switchable between a pair of mutually orthogonal polarizations (e.g., vertical and horizontal), as considered in each antenna plane. The antenna elements are supported by an octagonal main support 66, which also advantageously supports other components of the reader 20.

Figure 9:
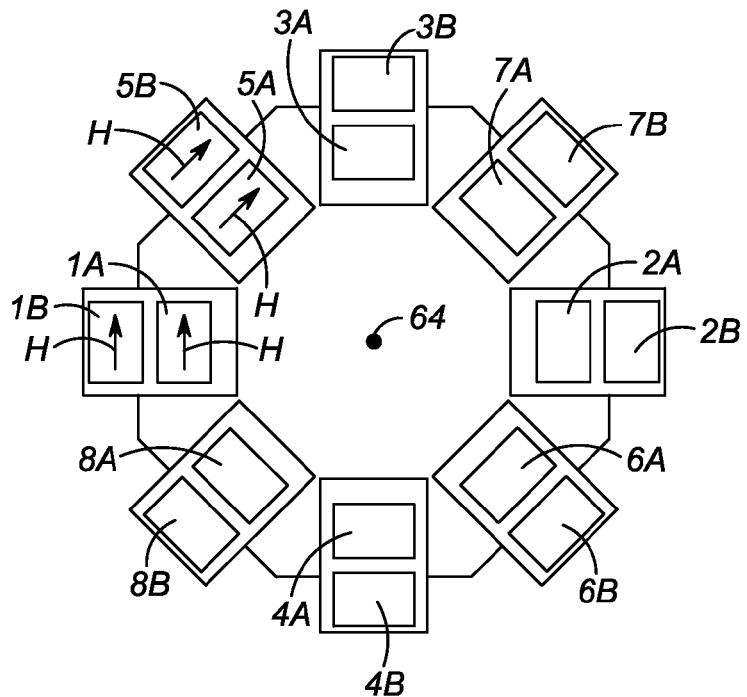
FIG. 9 is a view analogous to FIG. 7 depicting how the antenna elements are polarized in accordance with the prior art.

As shown in FIG. 9, it is known to energize two pairs of circumferentially adjacent antenna elements, i.e., antenna elements 1A, 1B, 5A and 5B, all with the same one of the orthogonal polarizations, e.g., horizontal, as indicated by the arrows H, to obtain four horizontally-polarized secondary receive beams. This, however, causes little electromagnetic power density to be present in a scan zone 68 (see FIG. 6) directly underneath the antenna array 60. This scan zone 68 extends over a conical, three-dimensional, spatial sector that subtends a solid angle whose vertex is centered on the vertical axis 64 or plumb line, that extends downwardly away from the vertex, and that measures about 30 degrees in elevation on each side of, and upwardly away from, the vertical axis 64, and 360 degrees in azimuth around the vertical axis 64. Since the above-described primary and secondary beams cannot be steered through the scan zone 68 because the beams of the antenna elements exhibit low directivity towards the scan zone 68, the true bearings of any tags located in the scan zone are not so accurately estimated, if at all. The amount of electromagnetic power density in the scan zone 68 may be sufficient for monitoring applications, but is less sufficient, and often insufficient, for locationing applications. As a result, the scan zone 68 has also been known as a so-called "dead" zone.

In accordance with this disclosure, the true bearings of tags are accurately estimated despite being the tags being located in this dead zone 68. The controller 16, in addition to executing the tag processing module 18 and the bearing processing module 22, is further operative for executing an antenna processing module 70 (see FIG. 8) operative, in one advantageous embodiment, for energizing a first pair of the antenna elements, e.g., 1A and 2A in FIG. 10 at opposite sides of the vertical axis 64, i.e., not circumferentially adjacent, to yield an electric field having one of the mutually orthogonal polarizations, e.g., horizontal (H), and for energizing a different second pair of the antenna elements, e.g., 3A and 4A in FIG. 10, at different opposite sides of the vertical axis 64 to yield an electric field having the other of the mutually orthogonal polarizations, e.g., vertical (V). It will be noted that antenna elements 1A and 2A are diametrically opposite to each other along a first horizontal, linear path or diameter 77 in FIG. 7, that antenna elements 3A and 4A are also diametrically opposite to each other along a second horizontal, linear path or diameter 78 in FIG. 7, and that the first and second horizontal, linear paths or diameters 77, 78 intersect and are mutually orthogonal to each other in FIG. 7. This arrangement causes the above-described primary and secondary beams to be formed, because the electric fields produced by the energized antenna elements may combine constructively in desired directions in the scan zone 68, and to be steered through the scan zone 68, so that the true bearings of any tags located in the scan zone 68 can now be accurately estimated.

Figure 10:
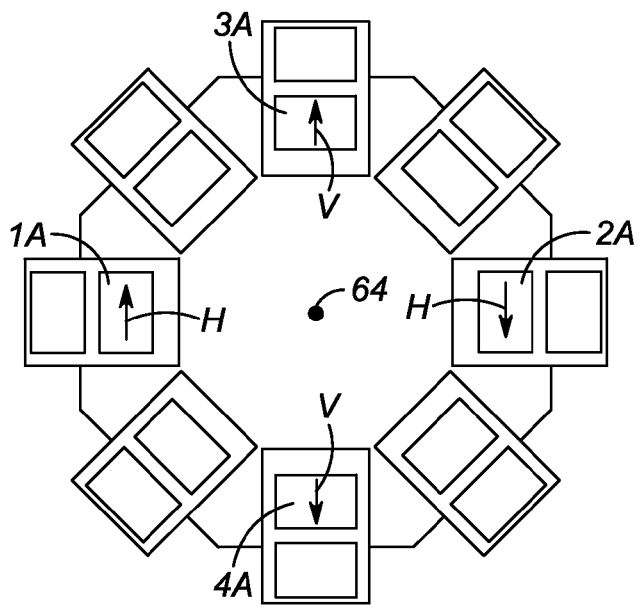
FIG. 10 is a view analogous to FIG. 7 depicting how the antenna elements are polarized in accordance with one embodiment of the present disclosure.
Figure 11:
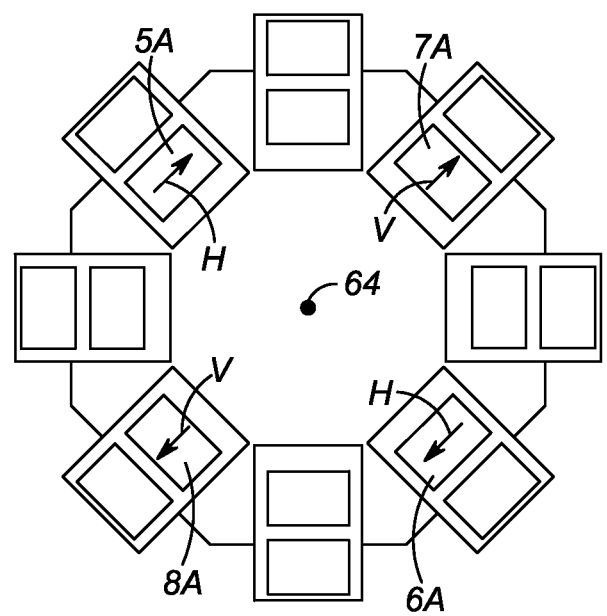
FIG. 11 is a view analogous to FIG. 7 depicting how the antenna elements are polarized in accordance with another embodiment of the present disclosure.

FIG. 11 is analogous to FIG. 10 and depicts that the first diametrically opposite pair could be the antenna elements 5A and 6A, and that the second diametrically opposite pair could be the antenna elements 7A and 8A. It will thus be understood that any four antenna elements in the array 60 could have been chosen, either on the upper annulus or the lower annulus. In this embodiment, the first pair is diametrically opposite to each other and has one of the mutually orthogonal polarizations (either vertical or horizontal), and the second pair is also diametrically opposite to each other and has the other of the mutually orthogonal polarizations (either horizontal or vertical), and the first and second pairs are oriented along mutually orthogonal, intersecting paths.

A further preferred embodiment features a different set of four antenna elements operated simultaneously to achieve a narrower beam width in one angular dimension by operating concurrently all four antenna elements in the upper and lower annuli along a given diameter. For instance, looking at FIG. 7, antenna elements 1A, 1B, 2A and 2B can be operated concurrently, using only the horizontal polarizations, or only the vertical polarizations, of each antenna element. Focusing now on a plane 75 defined by the vertical axis 64 and the diameter 77 crossing said axis 64 and the antenna elements 1A, 1B, 2A and 2B, it is possible to define an antenna pattern beam width based on the intersection of a tri-dimensional antenna pattern 67 and the plane 75, which is referred to herein as a co-planar beam width. Similarly, we can define a cross-planar beam width based on the intersection of the tri-dimensional antenna pattern 67 with a plane 79 defined by the vertical axis 64 and the diameter 78, where the diameter 78 is orthogonal to the plane 75. Since the vertical symmetry planes of the concurrently operating antenna elements 1A, 1B, 2A and 2B lay on the plane 75, it is well known that an antenna beam synthesized to point along, or near, the vertical axis 64, within the scan zone 68, will exhibit a co-planar beam width that is smaller than the cross-planar beam width. This feature can be advantageously employed, for instance, in the generation of secondary receive beams for tag location purposes, said beams featuring a narrower beam width in a desired plane compared with beams generated using only antenna elements in the upper annulus or in the lower annulus. The advantage consists in a better tag bearing angle discrimination capability due to the fact that synthesizing narrower beams in a desired plane yields a more rapid change of the signal difference, for instance (B−C), versus the angular coordinate on that plane.

It should also be observed that it is possible to further increase the beamforming capability of the array 60 by sequentially storing the readings from multiple sets of antenna elements and processing all of them later to realize secondary receive beams with enhanced characteristics, for instance higher directivity, different polarization states, etc. For instance, after acquiring the unweighted readings relative to antenna elements 1A (H_pol), 2A (H_pol), 3A (V_pol) and 4A (V_pol) and storing them before performing any combining, and then acquiring the readings relative to antenna elements 1B (H_pol), 2B (H_pol), 3B (V_pol) and 4B (V_pol) and storing them, it is possible to use beamforming techniques to synthesize higher directivity secondary beams. Or, for instance, if the readings relative to antenna elements 1B (V_pol), 2B (V_pol), 3B (H_pol) and 4B (H_pol) were selected in addition of those of the antenna elements 1A, 2A, 3A and 4A, then, upon properly weighting the "A" and "B" readings, it is possible to generate circular polarization states for the resulting secondary beams, which could, for instance, help mitigate multi-path interference.

Figure 8:
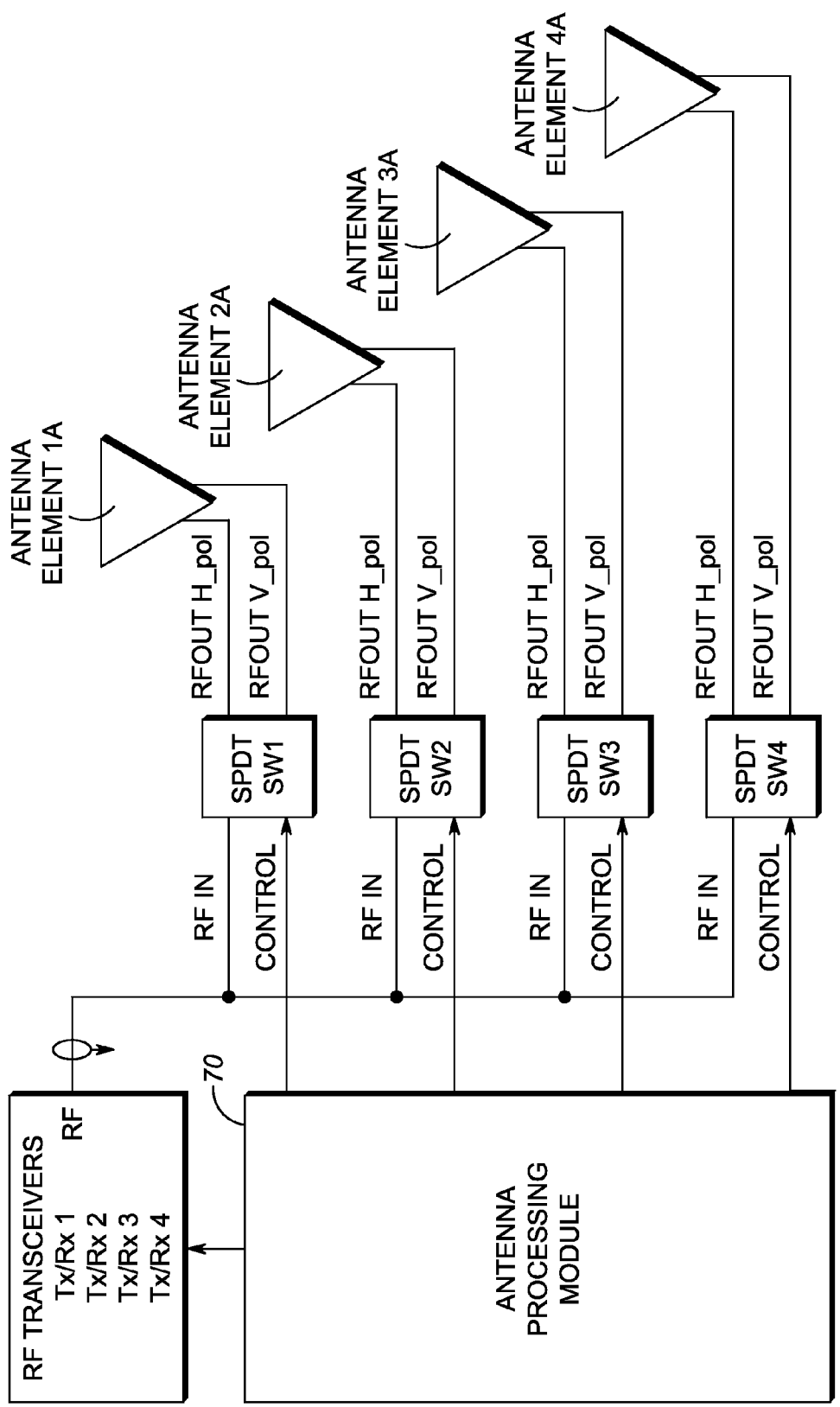
FIG. 8 is an electrical schematic depicting components for energizing a plurality of antenna elements of the overhead array with desired polarizations.

FIG. 8 depicts an example of a possible circuit by means of which each of the antenna elements 1A, 2A, 3A and 4A of FIG. 10 are polarized. Each antenna element is connected to a respective single-pole, double-throw, RF switch SW1, SW2, SW3 and SW4 having one input terminal connected to an RF signal from the transceivers Tx/Rx 1, Tx/Rx 2, Tx/Rx 3 and Tx/Rx 4, and another input control terminal connected to the antenna processing module 70. The antenna processing module 70 may be software-based, hardware-based, or could be implemented in both software and hardware. Under control by the controller 16, the antenna processing module 70 sends a control signal to each switch to either switch the RF input signal to be horizontally polarized (RF OUT H_pol) in a first switching state, or vertically polarized (RF OUT V_pol) in a second switching state. Thus, the polarization of any antenna element can be selected to achieve the polarizations shown, for example, in FIG. 10 or 11.

Figure 12:
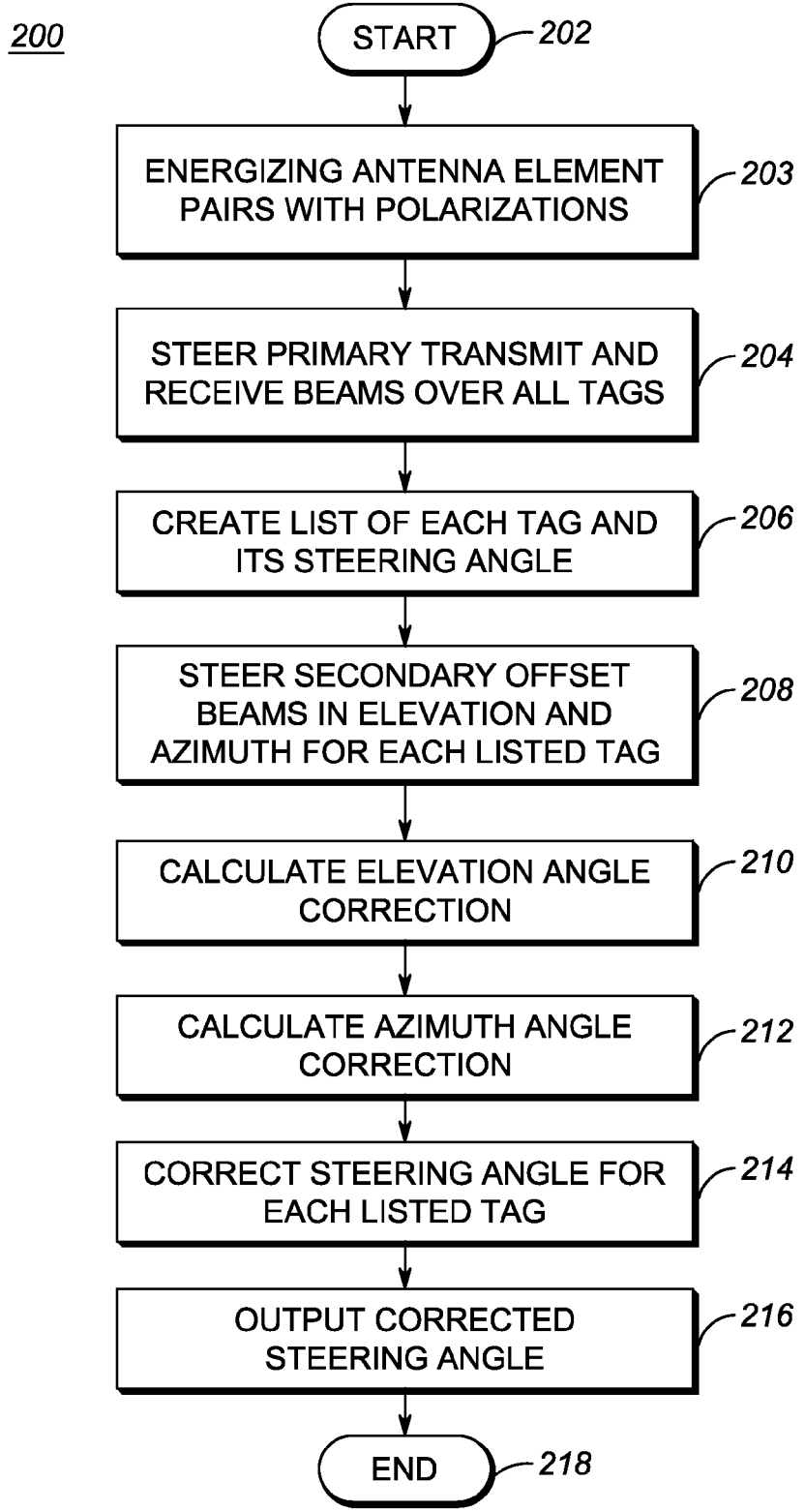
FIG. 12 is a flow chart depicting steps performed in accordance with a method of estimating true bearings of RFID tags associated with items in the controlled area and located in a zone directly underneath the overhead array of antenna elements of the RFID reader in accordance with the present disclosure.

As described above, and as shown in the flow chart 200 of FIG. 12, beginning at start step 202, the RFID system 10 accurately estimates the true bearings of RFID tags associated with the items 104, 106 in the controlled area 102, and especially in the scan zone directly underneath the overhead array 60, by energizing a plurality of the antenna elements at opposite sides of the vertical axis 64 to yield electric fields having polarizations and by switching each antenna element between mutually orthogonal polarizations (step 203), steering the primary transmit beam and the primary receive beam over all the tags (step 204), and by creating a list of all the tags that were read, together with the primary steering angle of the primary receive beam having the highest RSSI level for each tag that was read (step 206). Then, for each such listed tag, the system steers a set of secondary receive beams at steering angles that are offset in elevation and azimuth relative to the elevation and azimuth of the primary steering angle of the primary transmit beam or the primary receive beam (step 208). The listed tags may be re-read, once or multiple times, for each offset beam. Then, for each listed tag, the system calculates an elevation angle correction for the elevation of the primary steering angle (step 210) by dividing a difference and a sum of receive elevation offset signals for the elevation offset beams. Similarly, for each listed tag, the system calculates an azimuth angle correction to the azimuth of the primary steering angle (step 212) by dividing a difference and a sum of receive azimuth offset signals for the azimuth offset beams. Next, the steering angle is corrected for each listed tag (step 214), and the corrected steering angle, i.e., the true bearing for each listed tag is output (step 216). The method ends at step 218. In one embodiment, all the tags can be read, and then the reader can go back to each tag and estimate its bearing. In another embodiment, the bearing of each tag is estimated not as a subsequent activity.

By way of numerical example, in the following Table, a sample set of elevation pointing angle weighting factors w1, w2, w3 and w4 (see FIG. 4) are listed for two representative azimuth angles of 0 degrees and 90 degrees. The |wX| symbol represents the normalized weight magnitude for each weighting factor, and the <wX symbol represents the corrected weight angle in degrees for each weighting factor.

| Azimuth (deg.) | |w1| (mag.) | <w1 (deg.) | |w2| (mag.) | <w2 (deg.) | |w3| (mag.) | <w3 (deg.) | |w4| (mag.) | <w4 (deg.) |
|---|---|---|---|---|---|---|---|---|
| 0 | 0.933983 | 0 | 0.330965 | 355.4507 | 0.523427 | 91.20311 | 0.540355 | 279.285 |
| 90 | 0.560555 | 0 | 0.697511 | 188.5327 | 0.859195 | 277.9995 | 0.094134 | 281.324 |
| 0 | 0.930288 | 0 | 0.400366 | 327.0607 | 0.506948 | 74.56907 | 0.514875 | 262.3887 |
| 90 | 0.580431 | 0 | 0.721382 | 187.2877 | 0.813389 | 286.1874 | 0.17008 | 269.9846 |

-continued

| Azimuth (deg.) | \|w1\| (mag.) | <w1 (deg.) | \|w2\| (mag.) | <w2 (deg.) | \|w3\| (mag.) | <w3 (deg.) | \|w4\| (mag.) | <w4 (deg.) |
|---|---|---|---|---|---|---|---|---|
| 0  | 0.916051 | 0 | 0.497147 | 290.5239 | 0.480049 | 52.28113  | 0.480699 | 240.461  |
| 90 | 0.610776 | 0 | 0.749418 | 185.8635 | 0.742687 | 296.7147  | 0.248121 | 255.7095 |
| 0  | 0.894283 | 0 | 0.568638 | 264.9239 | 0.461371 | 36.34886  | 0.46029  | 225.123  |
| 90 | 0.639672 | 0 | 0.770521 | 185.0329 | 0.680517 | 304.8375  | 0.286068 | 242.8089 |
| 0  | 0.85999  | 0 | 0.645957 | 239.1771 | 0.442633 | 20.04748  | 0.441651 | 209.3871 |
| 90 | 0.674587 | 0 | 0.791395 | 184.2738 | 0.603625 | 314.9805  | 0.319507 | 226.1801 |
| 0  | 0.798941 | 0 | 0.739171 | 206.8563 | 0.425145 | 1.050718  | 0.427074 | 190.3314 |
| 90 | 0.720276 | 0 | 0.808361 | 183.5592 | 0.492822 | 331.7947  | 0.364286 | 198.7206 |
| 0  | 0.743335 | 0 | 0.803339 | 183.1769 | 0.415643 | 348.4146  | 0.420906 | 176.8845 |

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A radio frequency (RF) identification (RFID) tag reading system for estimating true bearings of RFID tags associated with items in a controlled area, comprising:
   an RFID reader having an overhead array of antenna elements arranged about a vertical axis, and a plurality of RF transceivers; and
   a controller operatively connected to the transceivers, and operative for controlling the transceivers by executing an antenna processing module operative for energizing a plurality of the antenna elements at opposite sides of the vertical axis to yield electric fields having polarizations, and for switching each antenna element between mutually orthogonal polarizations, the controller being further operative for controlling the transceivers by executing a tag processing module operative for steering a primary transmit beam throughout the controlled area, including a scan zone directly underneath the overhead array, by transmitting a primary transmit signal via the plurality of the antenna elements to each tag, and for steering a primary receive beam throughout the controlled area, including the scan zone, at a primary steering angle by receiving a primary receive signal via the plurality of the antenna elements from each tag, the controller being further operative for controlling the transceivers by executing a bearing processing module operative for steering a plurality of secondary receive beams throughout the controlled area, including the scan zone, at different secondary steering angles that are offset from the primary steering angle by receiving a plurality of secondary receive signals via the first and second pairs of the antenna elements from each tag, and by processing the secondary receive signals to determine a true bearing for each tag throughout the controlled area, including the scan zone.

2. The system of claim 1, wherein the controller is further operative for energizing a first pair of the antenna elements at opposite sides of the vertical axis to yield an electric field having one of the mutually orthogonal polarizations, and for energizing a different second pair of the antenna elements at different opposite sides of the vertical axis to yield an electric field having the other of the mutually orthogonal polarizations.

3. The system of claim 2, wherein the first pair of the antenna elements are diametrically opposite to each other along a first path across the axis, wherein the second pair of the antenna elements are diametrically opposite to each other along a second path across the axis, and wherein the first and second paths intersect and are mutually orthogonal.

4. The system of claim 2, and a switch for each antenna element, and wherein the controller is further operative for controlling each switch to switch the respective antenna element between the mutually orthogonal polarizations.

5. The system of claim 1, wherein the controller is further operative for energizing one pair of the antenna elements at opposite sides of the vertical axis to yield an electric field having one of the mutually orthogonal polarizations, and for energizing another pair of the antenna elements at the same opposite sides of the vertical axis to yield an electric field having the same one of the mutually orthogonal polarizations as that of the first pair of the antenna elements.

6. The system of claim 5, wherein the one pair of the antenna elements are diametrically opposite to each other along a first path across the axis at one elevation, wherein the other pair of the antenna elements are diametrically opposite to each other along a second path across the axis at another elevation, and wherein the first and second paths are generally parallel.

7. The system of claim 1, wherein the scan zone extends over a three-dimensional spatial sector that subtends a solid angle whose vertex is centered on the vertical axis, that extends downwardly away from the vertex, and that measures about 30 degrees in elevation on each side of, and upwardly away from, the vertical axis, and 360 degrees in azimuth around the vertical axis.

8. The system of claim 1, wherein the bearing processing module is operative for steering a first pair of the secondary receive beams at opposite sides of at least one of the primary transmit beam and the primary receive beam in elevation, and for processing a first pair of the secondary receive signals to obtain a pair of elevation offset signals; and wherein the bearing processing module is further operative for steering a second pair of the secondary receive beams at opposite sides of the at least one of the primary transmit beam and the primary receive beam in azimuth, and for processing a second pair of the secondary receive signals to obtain a pair of azimuth offset signals.

9. The system of claim 8, wherein the bearing processing module is operative for processing the elevation offset signals by dividing their difference by their sum to obtain an elevation error signal as an elevation correction to the primary steering angle, and wherein the bearing processing module is operative for processing the azimuth offset signals by dividing their difference by their sum to obtain an azimuth error signal as an azimuth correction to the primary steering angle.

10. A radio frequency (RF) identification (RFID) tag reading system for estimating true bearings of RFID tags associated with items in a controlled area, comprising:

an RFID reader mounted at an overhead location in the controlled area above a scan zone, and having an overhead array of antenna elements arranged about a vertical axis, and a plurality of RF transceivers;

a server operatively connected to the RFID reader; and a controller located in at least one of the RFID reader and the server and operatively connected to the transceivers, the controller being operative for controlling the transceivers by executing an antenna processing module operative for energizing a plurality of the antenna elements at opposite sides of the vertical axis to yield electric fields having polarizations, and for switching each antenna element between mutually orthogonal polarizations, the controller being further operative for controlling the transceivers by executing a tag processing module operative for steering a primary transmit beam throughout the controlled area, including the scan zone directly underneath the overhead array, by transmitting a primary transmit signal via the plurality of the antenna elements to each tag, and for steering a primary receive beam throughout the controlled area, including the scan zone, at a primary steering angle by receiving a primary receive signal via the plurality of the antenna elements from each tag, the controller being further operative for controlling the transceivers by executing a bearing processing module operative for steering a plurality of secondary receive beams throughout the controlled area, including the scan zone, at different secondary steering angles that are offset from the primary steering angle by receiving a plurality of secondary receive signals via the plurality of the antenna elements from each tag, and by processing the secondary receive signals to determine a true bearing for each tag throughout the controlled area, including the scan zone.

11. The system of claim 10, wherein the controller is further operative for energizing a first pair of the antenna elements at opposite sides of the vertical axis to yield an electric field having one of the mutually orthogonal polarizations, and for energizing a different second pair of the antenna elements at different opposite sides of the vertical axis to yield an electric field having the other of the mutually orthogonal polarizations.

12. The system of claim 11, wherein the first pair of the antenna elements are diametrically opposite to each other along a first path across the axis, wherein the second pair of the antenna elements are diametrically opposite to each other along a second path across the axis, and wherein the first and second paths intersect and are mutually orthogonal.

13. The system of claim 10, wherein the controller is further operative for energizing one pair of the antenna elements at opposite sides of the vertical axis to yield an electric field having one of the mutually orthogonal polarizations, and for energizing another pair of the antenna elements at the same opposite sides of the vertical axis to yield an electric field having the same one of the mutually orthogonal polarizations as that of the first pair of the antenna elements.

14. The system of claim 13, wherein the one pair of the antenna elements are diametrically opposite to each other along a first path across the axis at one elevation, wherein the other pair of the antenna elements are diametrically opposite to each other along a second path across the axis at another elevation, and wherein the first and second paths are generally parallel.

15. A radio frequency (RF) identification (RFID) tag reading method of estimating true bearings of RFID tags associated with items in a controlled area, comprising:
mounting an RFID reader at an overhead location in the controlled area above a scan zone;
arranging an overhead array of antenna elements for the reader about a vertical axis;
operatively connecting a plurality of RF transceivers to a controller;
controlling the transceivers by having a controller execute an antenna processing module operative for energizing a plurality of the antenna elements at opposite sides of the vertical axis to yield electric fields having polarizations, and for switching each antenna element between mutually orthogonal polarizations;
controlling the transceivers by having the controller execute a tag processing module operative for steering a primary transmit beam throughout the controlled area, including the scan zone directly underneath the overhead array, by transmitting a primary transmit signal via the plurality of the antenna elements to each tag, and for steering a primary receive beam throughout the controlled area, including the scan zone, at a primary steering angle by receiving a primary receive signal via the plurality of the antenna elements from each tag; and
controlling the transceivers by having the controller execute a bearing processing module operative for steering a plurality of secondary receive beams throughout the controlled area, including the scan zone, at different secondary steering angles that are offset from the primary steering angle by receiving a plurality of secondary receive signals via the plurality of the antenna elements from each tag, and by processing the secondary receive signals to determine a true bearing for each tag throughout the controlled area, including the scan zone.

16. The method of claim 15, wherein the energizing is performed by energizing a first pair of the antenna elements at opposite sides of the vertical axis to yield an electric field having one of the mutually orthogonal polarizations, and by energizing a different second pair of the antenna elements at different opposite sides of the vertical axis to yield an electric field having the other of the mutually orthogonal polarizations.

17. The method of claim 16, and arranging the first pair of the antenna elements to be diametrically opposite to each other along a first path across the axis, arranging the second pair of the antenna elements to be diametrically opposite to each other along a second path across the axis, and configuring the first and second paths to intersect and be mutually orthogonal.

18. The method of claim 15, wherein the energizing is performed by energizing one pair of the antenna elements at opposite sides of the vertical axis to yield an electric field having one of the mutually orthogonal polarizations, and by energizing another pair of the antenna elements at the same opposite sides of the vertical axis to yield an electric field having the same one of the mutually orthogonal polarizations as that of the first pair of the antenna elements.

19. The method of claim 18, and arranging the one pair of the antenna elements to be diametrically opposite to each other along a first path across the axis at one elevation, arranging the other pair of the antenna elements to be diametrically opposite to each other along a second path across the axis at another elevation, and configuring the first and second paths to be generally parallel.

20. The method of claim 15, and configuring the scan zone to extend over a three-dimensional spatial sector that subtends a solid angle whose vertex is centered on the vertical axis, that extends downwardly away from the vertex, and that measures about 30 degrees in elevation on each side of, and upwardly away from, the vertical axis, and 360 degrees in azimuth around the vertical axis.

* * * * *